US00RE35626E

United States Patent [19]

Iizuka

[11] E Patent Number: Re. 35,626

[45] Reissued Date of Patent: Oct. 14, 1997

[54] STOPPING DEVICE FOR AN EYELET BUTTON HOLING MACHINE

[75] Inventor: Tetsuo Iizuka, Chofu, Japan

[73] Assignee: Juki Corporation, Chofu, Japan

[21] Appl. No.: 258,089

[22] Filed: Jun. 10, 1994

Related U.S. Patent Documents

Reissue of:

[64] Patent No.: 4,730,565
Issued: Mar. 15, 1988
Appl. No.: 43,149
Filed: Apr. 27, 1987

[51] Int. Cl.[6] ..... D05B 3/08; D05B 69/22

[52] U.S. Cl. ..... 112/67; 112/274

[58] Field of Search ..... 112/67, 66, 274, 112/87, 220, 271, 264.1, 475.25

[56] References Cited

U.S. PATENT DOCUMENTS 3,499,404 3/1970 Nicolay ..... 112/67
3,804,038 4/1974 Martin et al. ..... 112/67

FOREIGN PATENT DOCUMENTS 60-58996 12/1985 Japan .
61-1155 1/1986 Japan .
61-5753 2/1986 Japan .
61-226094 10/1986 Japan .

*Primary Examiner*—Peter Nerbun
*Attorney, Agent, or Firm*—Morgan & Finnegan, L.L.P.

[57] ABSTRACT

A stopping device for an eyelet button holing machine provides a stopper arm which plunges into a recess portion of a stopper cam positioned coaxial to the main shaft. To absorb the stopping impulse, extra wheel cams are provided coaxial to the main shaft which induce the stopper arm to be inclined such that its position causes a clutch pulley to contact with a low speed pulley and then the stopper arm plunges into the recess portion of the stopper cam. Thus, the machine is stopped in two steps and the stopping impulse force is effectively alleviated.

12 Claims, 8 Drawing Sheets

STOPPING DEVICE FOR AN EYELET BUTTON HOLING MACHINE

Matter enclosed in heavy brackets [ ] appears in the original patent but forms no part of this reissue specification; matter printed in italics indicates the additions made by reissue.

*This is a reissue patent application of U.S. Pat. No. 4,730,565.*

BACKGROUND OF THE INVENTION

The invention relates to an eyelet button holing machine which is designed to stop by applying a stopper against rotation of the main shaft after reducing the main shaft speed from high to low speed.

According to conventional stopping mechanisms for eyelet button holing machines, a stopping cam provided at the main shaft and a stopping arm which engages with the stopping cam provide a hooking mechanism to stop the main shaft. The hook plunges into a recess portion of the stopping cam so that the main shaft is suddenly stopped.

In accordance with this type of eyelet button holing machine, if the ambient temperature is high (30°–40° C.), when the stopper arm acts to stop the main shaft after completion of an eyelet button holing, the hooking mechanism does not work smoothly and in the worst case, the hook is driven out from the stopper cam. The reason for such a malfunction is that the oil viscosity is lowered due to a high ambient temperature and the machine is therefore running at an unexpectedly higher speed when trying to suddenly stop the machine. Accordingly, the hook is kicked out by the stopper cam and the stitching can not terminate at a predetermined point. Conversely, if the ambient temperature is low (0°–10° C.), the machine speed is lowered due to the high oil viscosity and, when trying to stop the machine, it stops before terminating the last stitch due to the high oil viscosity.

SUMMARY OF THE INVENTION

With the foregoing in mind, it is an object of the invention to provide a new and improved stopping device for button holing machines.

As discussed above, the conventional type of eyelet button holing machine provides a stopper cam at the main shaft and a stopper arm which engages with the stopper cam providing a hooking mechanism to stop the main shaft by plunging the hook into a recess portion of the stopper cam.

According to the instant invention, wheel cams are provided at the main shaft to regulate the inclined angle of the stopper arm. A clutch pulley positioned between the high speed pulley and the low speed pulley and sliding along the main shaft is also provided. Additionally, a clutch cam which rotates in relation to the inclined angle of the stopper arm and a clutching mechanism which causes the rotation of main shaft to shift to the high speed pulley or to the low speed pulley depending on the positioning of the clutch cam are provided.

When the stopper arm inclines to a preset point, the stopper arm actuates the clutch cam to position itself such that the clutching mechanism transmits rotation from high to low speed by sliding the clutch pulley along the main shaft. As the stopper arm inclines further, the hook plunges into the recess portion of the stopper cam. Thus, the rotation of main shaft may be suddenly stopped.

BRIEF DESCRIPTION OF THE DRAWINGS

The accompanying drawings referred to herein and constituting a part hereof, illustrate a preferred embodiment of the invention and, together with the description, serve to explain the principles of the invention, wherein:

FIG. 7 are schematic drawings illustrating the relative motion between a clutch cam and a clutch pulley;

DETAILED DESCRIPTION OF THE DRAWINGS

Figure 1:
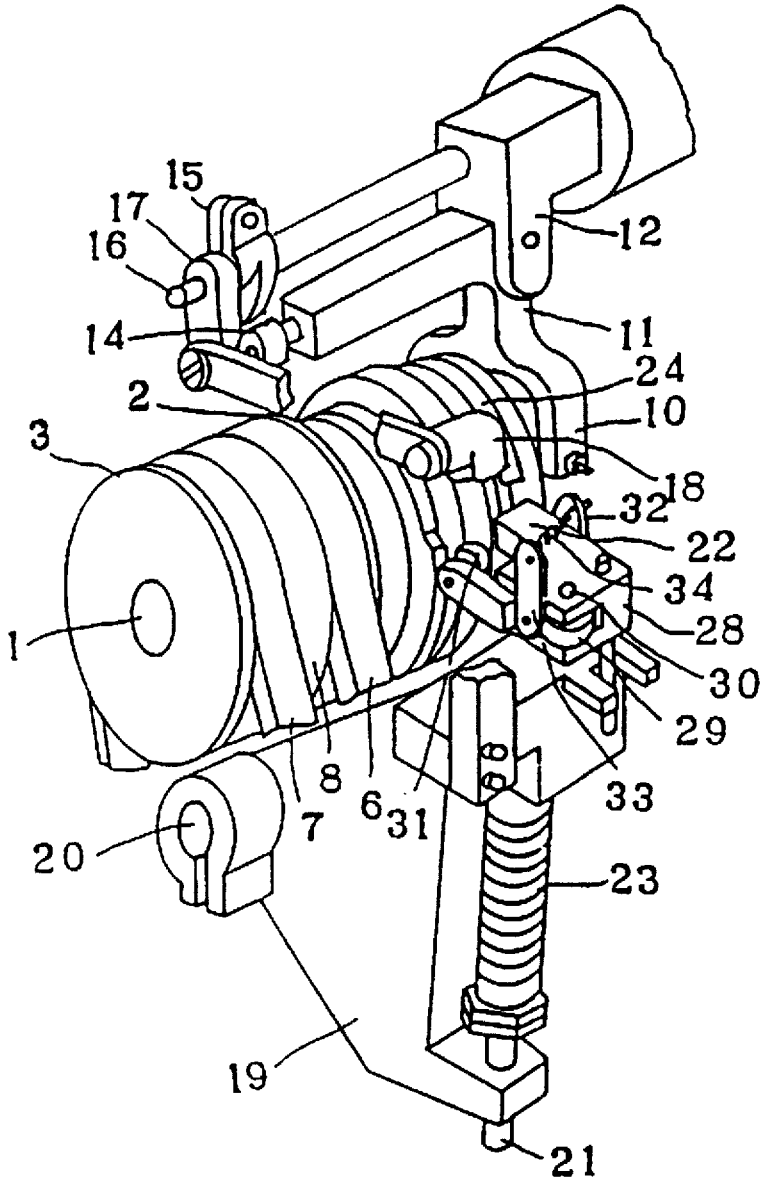
FIG. 1 is a perspective view of a stopping mechanism for an eyelet button holing machine according to this invention.
Figure 2:
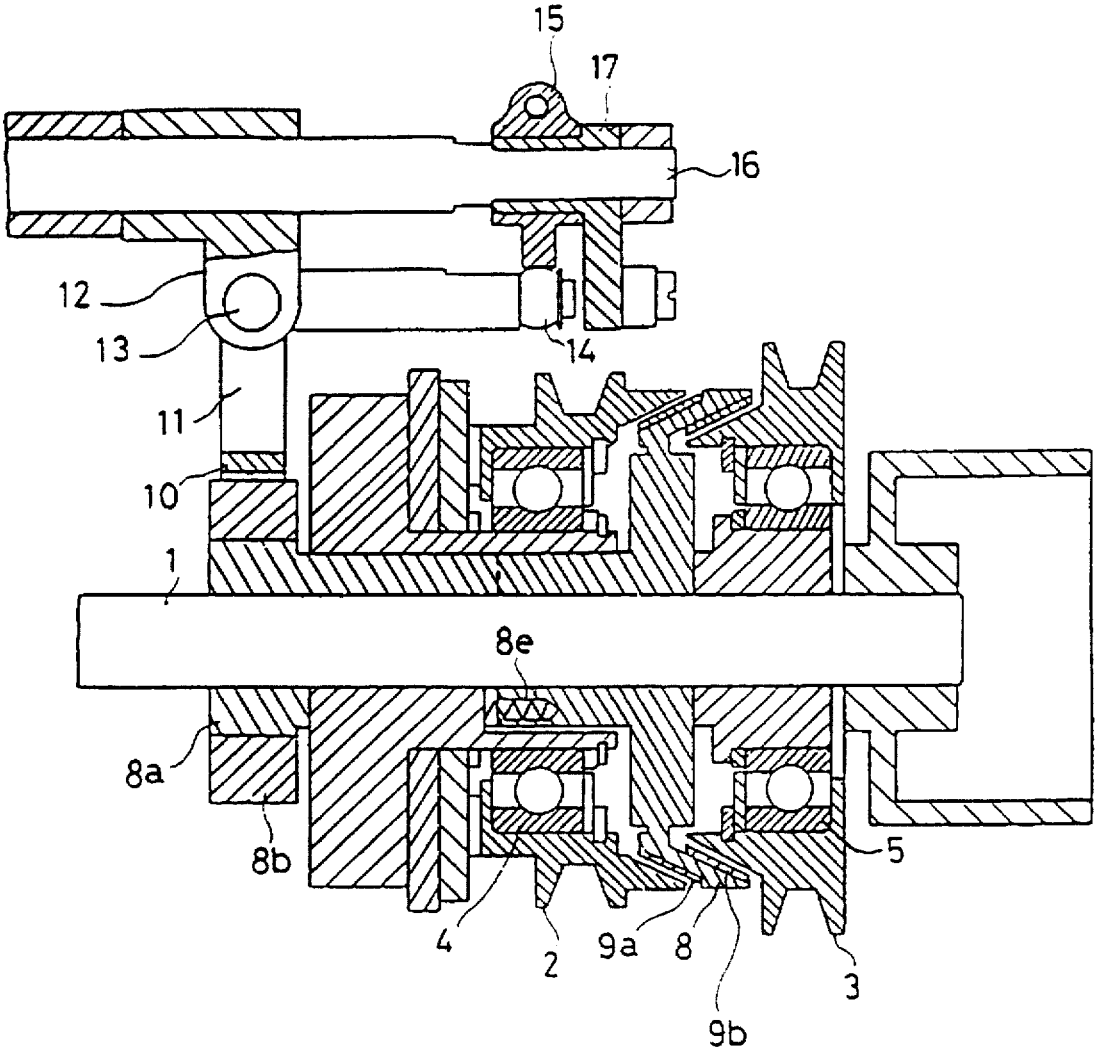
FIG. 2 is an enlarged section view of a FIG. 1.

Referring to the accompanying drawings, one preferred embodiment of this invention will be explained hereinafter. FIG. 1 is a perspective view of a stopping device for an eyelet button holing machine. FIG. 2 is a partially enlarged sectional view of FIG. 1. Referring to FIG. 2, a high-speed pulley 2 and a low-speed pulley 3 are sustained on main shaft 1 by insert bearings 4 and 5, respectively.

Referring to FIG. 1, a motor (not shown) drives the high speed pulley 2 with a belt 6 and the low speed pulley 3 with a belt 7, connected respectively thereto. Thus, the high-speed pulley 2 and the low-speed pulley 3 may rotate irrespective of the rotation of shaft 1. Between high-speed pulley 2 and low-speed pulley 3, a clutch pulley 8 is positioned such that it slides along the main shaft 1. The clutch pulley 8 provides frictional material 9a, 9b at both its hemming sides as shown in FIG. 2. When the clutch pulley 8 moves leftward, the frictional material 9a contacts with the high-speed pulley 2 and the main shaft 1 starts high-speed rotation. When the clutch pulley 8 moves rightward, the frictional material 9b contacts with the low-speed pulley 3 and the main shaft 1 starts low-speed rotation. The clutch pulley also provides an extended portion 8a.

Figure 3:
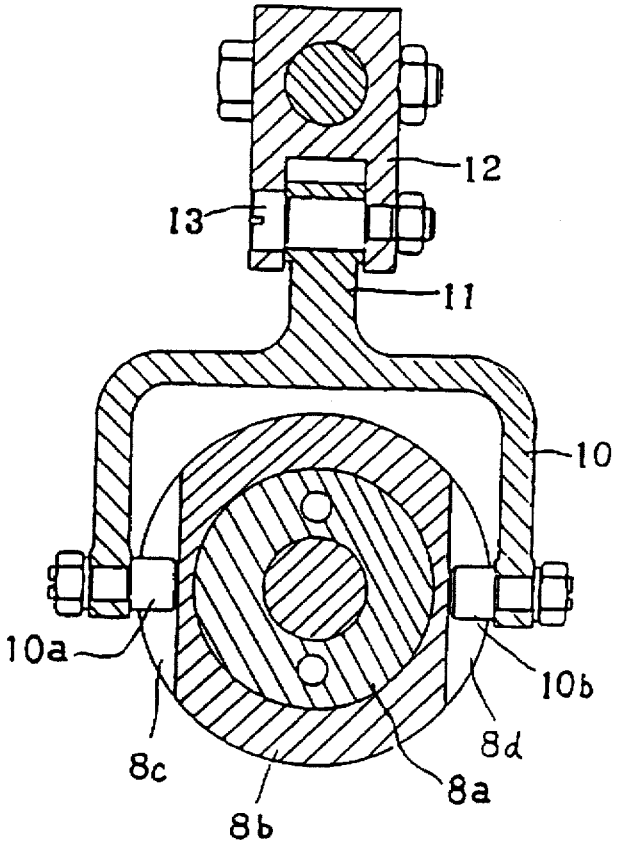
FIG. 3 is a section view of a yoke portion.

Referring to FIG. 2 and FIG. 3, at the end of the extended portion 8a, coupler 8b engages non-rotatably with extended portion 8a. The coupler 8b provides recesses 8c, 8d and into each such recess projection 10a, 10b, projected from the end of a shifting yoke 10, are engaged. End portion 11 of the shifting yoke 10 is rotatably sustained by an eccentric shaft 13. The reason for the shaft 13 being eccentric is that the eccentricity may be very effective when the shifting motion of the shifting yoke is to be adjusted. By rotating the eccentric shaft 13, the contact position between the clutch pulley 8 and the driver pulleys 2, 3 may be adjusted.

At the middle portion of the clutch pulley 8, a spring 8e is provided such that clutch pulley 8 is normally urged toward the low-speed pulley 3 side by the spring (see FIG. 2).

Referring to FIG. 2, end portion 11 of the shifting yoke 10 provides an extension portion parallel with the main shaft and, at the end of this extension, a ball roller 14 is provided.

Figure 4:
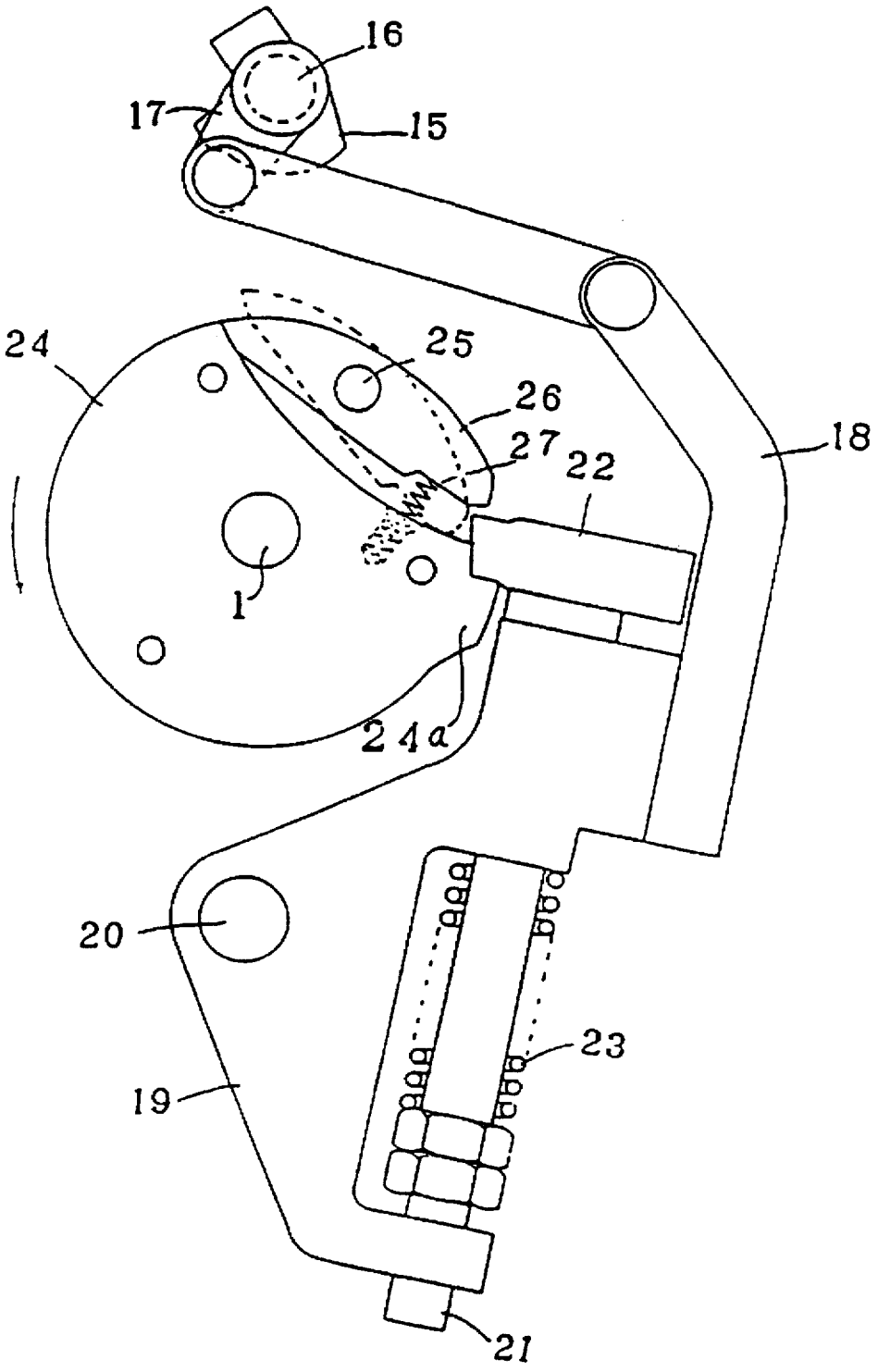
FIG. 4 is an explanatory drawing of a stopping mechanism.

The ball roller 14 is in contact with a clutch cam 15. Referring to FIG. 1 and FIG. 4, the clutch cam 15 is supported by a sustaining shaft 16. A link 17 is fixed to the sustaining shaft 16 and the link 17 is connected to stopper arm 19 via internal link 18. The stopper arm 19 is rotatably sustained by a shaft 20. A slidable shaft 21 extends through the stopper arm 19 and provides a stopper hook 22 at its upper end. The slidable shaft 21 is pulled downwardly by spring 23 which surrounds the slidable shaft 21 and is in a compressed condition such that the stopper hook 22 is normally in contact with the end of the stopper arm 19. Facing against the stopper arm 19 is located stopper cam 24 which is fixed to the main shaft 1.

Referring to FIG. 4, the stopper cam 24 provides a stopper 26 which rotates around a shaft 25. The stopper 26 is normally urged upward by a spring 27 to provide some clearance such that the stopper cam 24 may receive the end portion of the stopper hook 22 when the stopper hook 22 plunges into the stopper cam 24. When the stopper hook 22 is just about to plunge into the stopper cam 24, the stopper 26 is positioned as shown by the dotted line as the stopper hook 22 is pushing the stopper. As the stopper cam 24 rotates a little more, the stopper hook 22 plunges into the recess formed at the stopper cam 24 as shown in FIG. 4 since the spring 27 pushes up the stopper 26. Thus, the stopper cam 24 is completely stopped and even reverse rotation is restrained since the stopper 26 is obstructed by the stopper hook 22.

Figure 5A:
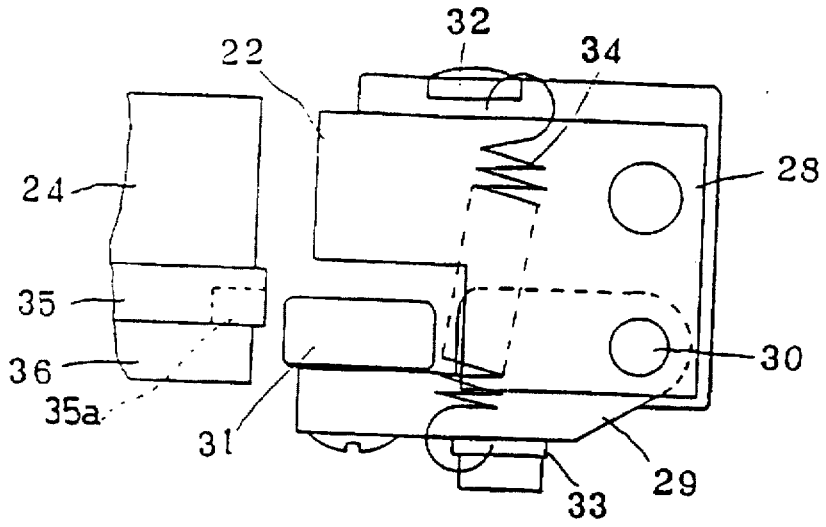
FIG. 5A illustrates a machine running at high-speed.

Referring to FIG. 1 and FIG. 5A, rotatable body 29 is rotatably sustained by a shaft 30 and this shaft 30 is provided at a support body 28 which supports the stopper hook 22. A positioning roller 31 is provided at the end of the rotatable body 29. A spring 34, placed between projection 32 and projection 33 keeps the positioning roller 31 in parallel with the stopper hook 22. (The spring 34 is in neither a stretched nor compressed condition but just placed as it is.)

Figure 6:
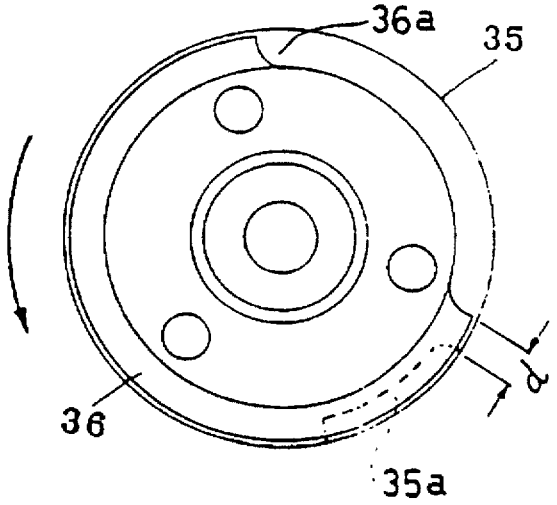
FIG. 6 is a side view of a large wheel cam and a small wheel cam.

Referring to FIG. 5 A–C and FIG. 6, facing against the positioning roller 31, a larger wheel cam 35 and a smaller wheel cam 36 are disposed such that the two wheel cams rotate with the stopper cam 24. The smaller wheel cam 36 provides a recess 36a at its periphery. The larger wheel cam 35 provides a recess 35a and the recess is positioned with some spacing "d" from end of the recess 36a as shown in FIG. 6.

Under the above-described mechanical construction, the button holing operation will now be explained hereinafter.

Referring to FIG. 2 and FIG. 4, when the eyelet button holing machine is energized, the shaft 20 rotates in association with the workpiece feeding motion and the stopper arm 19 rotates clockwise slightly releasing the engagement between the stopper hook 22 and the stopper cam 24. As the stopper arm 19 rotates clockwise, the link 17 rotates counter-clockwise around the sustaining shaft 16. The clutch cam 15 also rotates counter-clockwise causing the yoke 10 to rotate counter-clockwise around the eccentric shaft 13 slightly, then to rotate clockwise, and as a result the clutch pulley 8 moves leftward and the clutch pulley 8 contacts with high speed pulley 2. Thus, the eyelet button holing machine starts at high-speed.

Figure 5B:
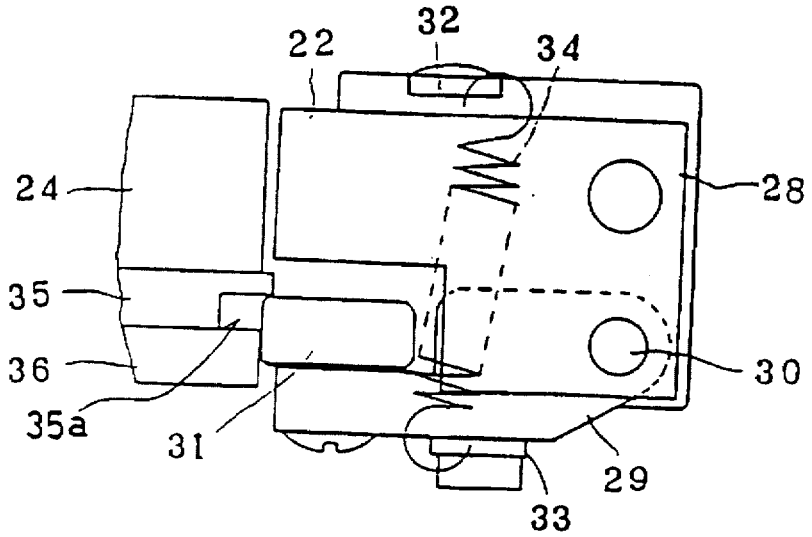
FIG. 5B illustrates a machine running at low-speed.
Figure 5C:
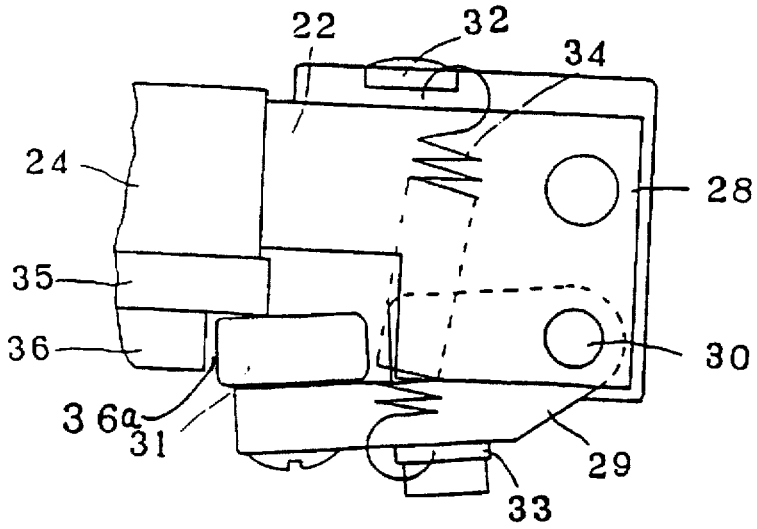
FIG. 5C illustrates a machine stopped.

Referring to FIG. 5A, FIG. 5B, and FIG. 5C, when the eyelet button holing is finished and the shaft 20 is returned to home position by a spring (not shown), the stopper arm 19 rotates counter-clockwise around shaft 20 and the positioning roller 31 contacts with the larger wheel cam 35. At this first stage of movement, the clutch pulley 8 runs normally as the clutch pulley 8 is in contact with the high-speed pulley 2. Then, as main shaft 1 rotates further, the recess 35a meets with the positioning roller 31 and the positioning roller 31 drops into this recess. Thus, the positioning roller 31 contacts with the smaller wheel cam 36 as shown in FIG. 5B.

At the second stage of movement, the clutch cam 15 rotates clockwise, causing the ball roller 14 to be released. (Referring FIG. 7B, the ball roller 14 is not in contact with the clutch cam 15.) Thereby, the yoke 10 causes the clutch pulley 8 to contact with the low-speed pulley 3 by the spring 8e which are inserted in the clutch pulley body. Thus, the rotation speed of main shaft 1 is reduced. Under such a condition, the stopper hook 22 has not yet engaged with the stopper cam 24.

As the main shaft 1 makes one more rotation, the recess 36a provided at the periphery of the smaller wheel cam 36 faces the positioning roller 31 and thereby the positioning roller 31 slides inclinedly into recess 36a as shown in FIG. 5C. In this third stage of movement, the clutch cam 15 rotates slightly clockwise and causes the ball roller 14 to move slightly downward. As a result the yoke 10 causes the clutch pulley 8 to be disengaged from the low-speed pulley 3. Thus, the main shaft is disengaged from the driving force and runs freely like a flywheel.

Then, the stopper hook 22 reaches the periphery of the stopper cam 24 and brakes the rotating stopper hook 22. As the stopper cam 24 rotates further, the stopper hook 22 collides with projected portion 24a and the stopper 26 opens (rotates counter clockwise around shaft 25) and receives the stopper hook 22. Impulse energy caused by the collision between the projected portion 24a and the stopper hook 22 is absorbed by the spring 23 and, accordingly, the main shaft 1 stops without a shock. Thereafter the drive motor (not shown) for the button holing machines switches its rotation from the main shaft 1 to worktable feeding, the worktable resumes its home position, and one cycle of eyelet button holing is finished.

Figure 7A:
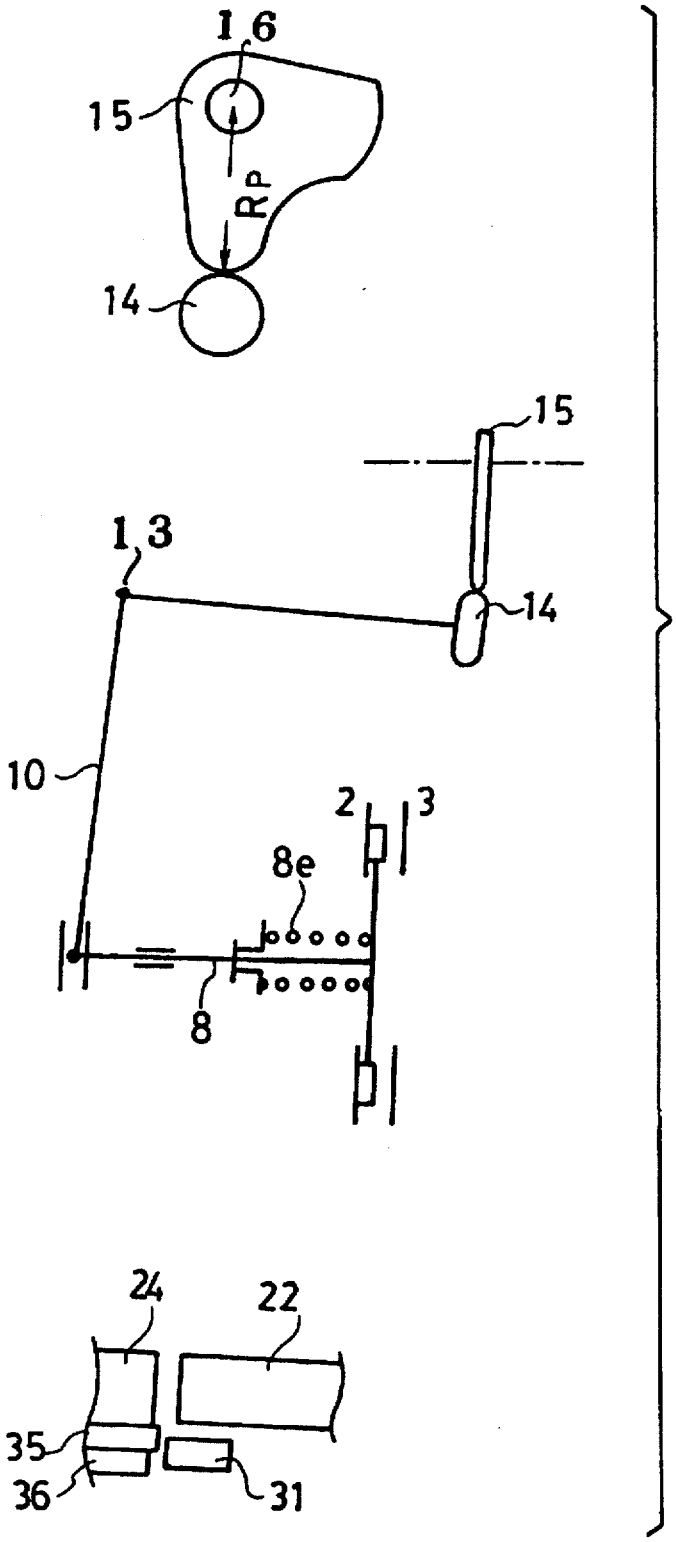
FIG. 7A illustrates a machine running at high-speed.
Figure 7B:
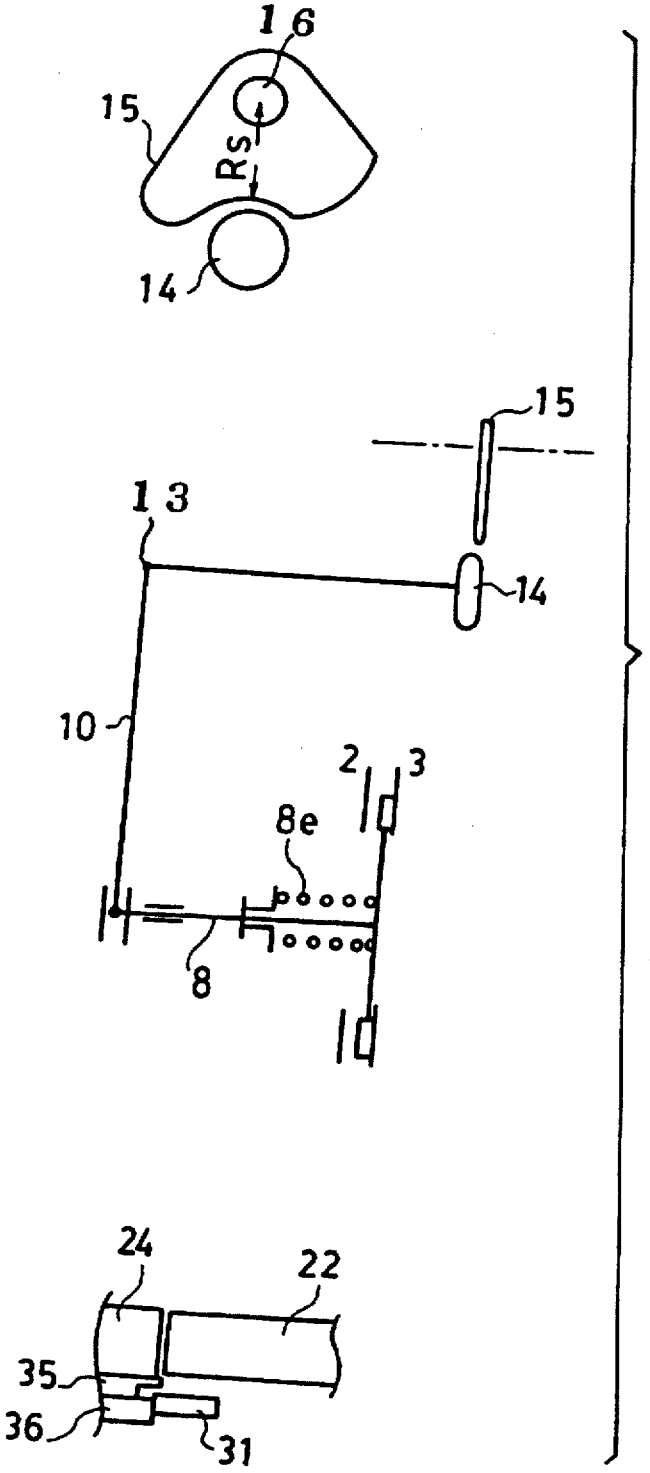
FIG. 7B illustrates a machine running at low-speed.
Figure 7C:
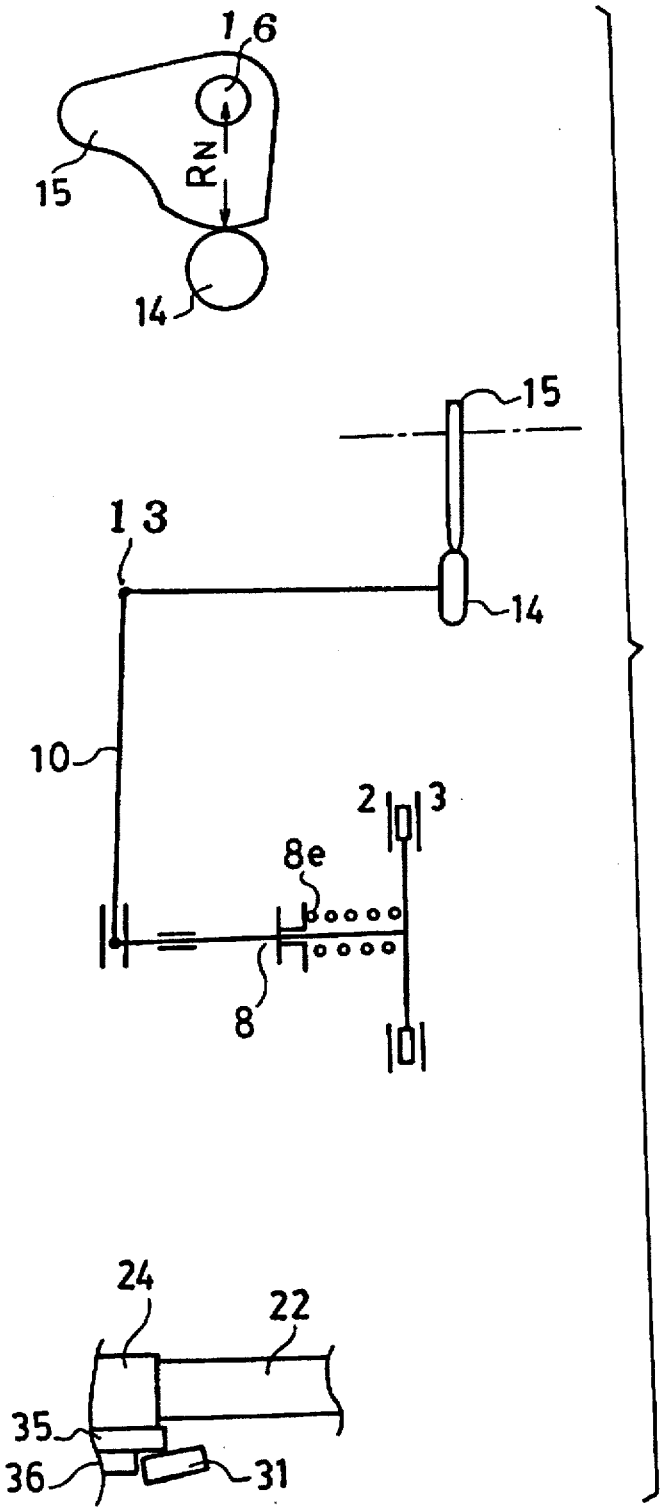
FIG. 7C illustrates a machine stopped.

Referring to FIG. 7A to FIG. 7C, the aforementioned mechanism of this invention may be easily understood. The clutch cam 15 is configured in the relation of $R_p>R_N>R_S$ as shown in FIG. 7.

FIG. 7C illustrates when the machine is stopped and the clutch pulley is in neutral position. As the clutch cam 15 rotates counter-clockwise and is positioned as shown in FIG. 7A, the ball roller 14 is pushed down further and the yoke 10 rotates clockwise around the eccentric shaft 13, the clutch pulley 8 engages with the high-speed pulley 2, and the machine starts at high speed. Such a condition is illustrated in FIG. 7A.

As the clutch cam 15 rotates clockwise, the ball roller 14 is released from the clutch cam 15, the clutch pulley 8 is pushed to the low-speed pulley 3 by the spring 8e, and the machine runs at low-speed. To press the clutch pulley 8 to the low-speed pulley with the spring 8e, there is provided some clearance between the ball roller 14 and the clutch cam 15. Such a condition is illustrated in FIG. 7B.

As the clutch cam 15 rotates clockwise further, since the stopper hook 22 plunges into the recess and the stopper arm 19 rotates counter-clockwise, the clutch cam 15 rotates clockwise, the ball roller 14 is pushed down, the yoke 10 rotates clockwise, and the clutch pulley 8 is positioned at neutral. Such a condition is illustrated in FIG. 7C. The bottom row of pictures of FIG. 7A, FIG. 7B, and FIG. 7C correspond to FIG. 5A, FIG. 5B and FIG. 5C, respectively.

According to this embodiment, the main shaft speed is stopped in two steps (high-low) and thereby stopping shock is absorbed, noise is reduced, impact shock on the machine parts is reduced, and resultantly stable stopping is obtained. Additionally, on starting, since the clutch pulley 8 contacts with the high speed pulley by the clutch cam 15 forcedly, the stable contact between the clutch pulley 8 and the high-speed pulley 2 is secured and thus starting is very smooth, the stitch cycle time is shortened, and higher productivity is promoted.

As many apparently widely different embodiments of the invention may be made without departing from the spirit and scope thereof, it is to be understood that the invention is not limited to the specific embodiment described herein except as defined in the appended claims.

What is claimed:

1. In an eyelet button holing machine which provides a stopper cam at a main shaft, a stopper arm having a stopper hook which is arranged to engage with said stopper cam by plunging said stopper hook into a recess portion of the stopper cam, a stopping device comprising:

(a) wheel [cams] *cam means* provided at the main shaft [and arranged to vary] *for varying* the inclination of the stopper arm by engaging with the stopper arm, *wherein said wheel cam means includes at least two cams*;

(b) a high-speed pulley [adapted to transmit] *for transmitting* the high speed of the main shaft;

(c) a low-speed pulley [adapted to transmit] *for transmitting* the low speed of the main shaft;

(d) a clutch pulley slidably placed between said high-speed pulley and said low-speed pulley;

(e) a clutch cam [adapted to rotate] *for rotating* in association with the stopper arm; and (f) a yoke [adapted to cause said clutch pulley to contact] *for effecting contact of said clutch pulley either* with said high-speed pulley or with said low-speed pulley by rotating said clutch cam.

2. A stopping device for an eyelet button holing machine as recited in claim 1, further comprising an eccentric shaft inserted into said yoke such that the contact positions between the clutch pulley and the high-speed pulley and the clutch pulley and the low-speed pulley may be adjusted.

*3. A stopping device for an eyelet button holing machine as recited in claim 1, wherein said wheel cams include means for varying the inclination of the stopper arm so that said clutch pulley contacting said high-speed pulley then contacts said low-speed pulley, and finally stops between said high-speed pulley and said low-speed pulley.*

*4. A stopping device for an eyelet button holing machine as recited in claim 1, comprising a sustaining shaft around which said clutch cam is rotatable, and wherein said clutch cam comprises:*

*a first convex portion in which said clutch cam has a rotational radius $R_P$ with respect to said sustaining shaft;*

*a second convex portion in which said clutch cam has a rotational radius $R_N$ with respect to said sustaining shaft; and*

*a concave portion, located between said first convex portion and said second convex portion, said clutch cam having a minimum distance $R_S$ from said sustaining shaft, $R_P$ being larger than $R_S$, and $R_S$ being larger than $R_N$.*

*5. A stopping device for an eyelet button holing machine as recited in claim 4, further comprising a ball roller, coupled to said yoke, said ball roller contacting said clutch cam when facing said first convex portion and said second convex portion of said clutch cam, and said ball roller being offset from said clutch cam when facing the concave portion of said clutch cam,*

*wherein said clutch pulley contacts said high-speed pulley when said ball roller faces said first convex portion, said clutch pulley contacts said low-speed pulley when said ball roller faces said concave portion, and said clutch pulley is located at a neutral position between said high-speed pulley and said low-speed pulley when said ball roller faces said second convex portion.*

*6. A stopping device for an eyelet button holing machine as recited in claim 1, wherein said wheel cams are engaged with the main shaft, said wheel cams comprising:*

*a first wheel cam having a first recess; and*

*a second wheel cam having a second recess and being smaller than said first wheel cam, said first wheel cam and said second wheel cam being incorporated so that the first recess is offset from the second recess,*

*wherein said clutch pulley contacts said high-speed pulley until the stopper arm located apart from the first cam wheel contacts said first wheel cam,*

*wherein said clutch pulley contacts said low-speed pulley until the stopper arm contacting said first wheel cam contacts said second wheel cam through the first recess of said first wheel cam, and*

*wherein said clutch pulley stops between said high-speed pulley and said low-speed pulley when the stopper arm contacting said second wheel cam through the first recess of said first wheel cam is plunged into the second recess of said second wheel cam, and the stopper hook is plunged into the recess portion of the stopper cam.*

*7. A stopping device for an eyelet button holing machine as recited in claim 1, further comprising a positioning roller, engaged with the stopper arm, which positioning roller changes, in cooperation with said wheel cams, speed of the main shaft, whereby the stopper arm is engageable with said wheel cams through said positioning roller.*

*8. A stopping device for an eyelet button holing machine as recited in claim 7, further comprising means for rotatably engaging said positioning roller with the stopper arm.*

*9. A stopping device for an eyelet button holing machine as recited in claim 7, wherein said wheel cams are engaged with the main shaft, said wheel cams comprising:*

*a first wheel cam having a first recess; and*

*a second wheel cam having a second recess and being smaller than said first wheel cam, said first wheel cam and said second wheel cam being incorporated so that the first recess is offset from the second recess,*

*wherein said clutch pulley contacts said high-speed pulley when said positioning roller located apart from the first cam wheel contacts said first wheel cam,*

*wherein said clutch pulley contacts said low-speed pulley when said positioning roller contacting said first wheel cam contacts said second wheel cam through the first recess of said first wheel cam, and*

*wherein said clutch pulley stops between said high-speed pulley and said low-speed pulley when said positioning roller contacting said second wheel cam through the first recess of said first wheel cam is plunged into the second recess of said second wheel cam, and the stopper hook is plunged into the recess portion of the stopper cam.*

*10. A stopping device for an eyelet button holing machine as recited in claim 9, further comprising means for rotatably engaging said positioning roller with the stopper arm, said positioning roller being plunged into the second recess of said second wheel cam while rotated relative to the stopper arm.*

*11. A stopping device for an eyelet button holing machine as recited in claim 1, further comprising shock absorber means, coupled to the stopper arm, for absorbing shock applied to the stopper hook.*

*12. A stopping device for an eyelet button holing machine as recited in claim 11, wherein said shock absorber means comprises a spring provided for the stopper arm.*

* * * * *